UNITED STATES PATENT OFFICE.

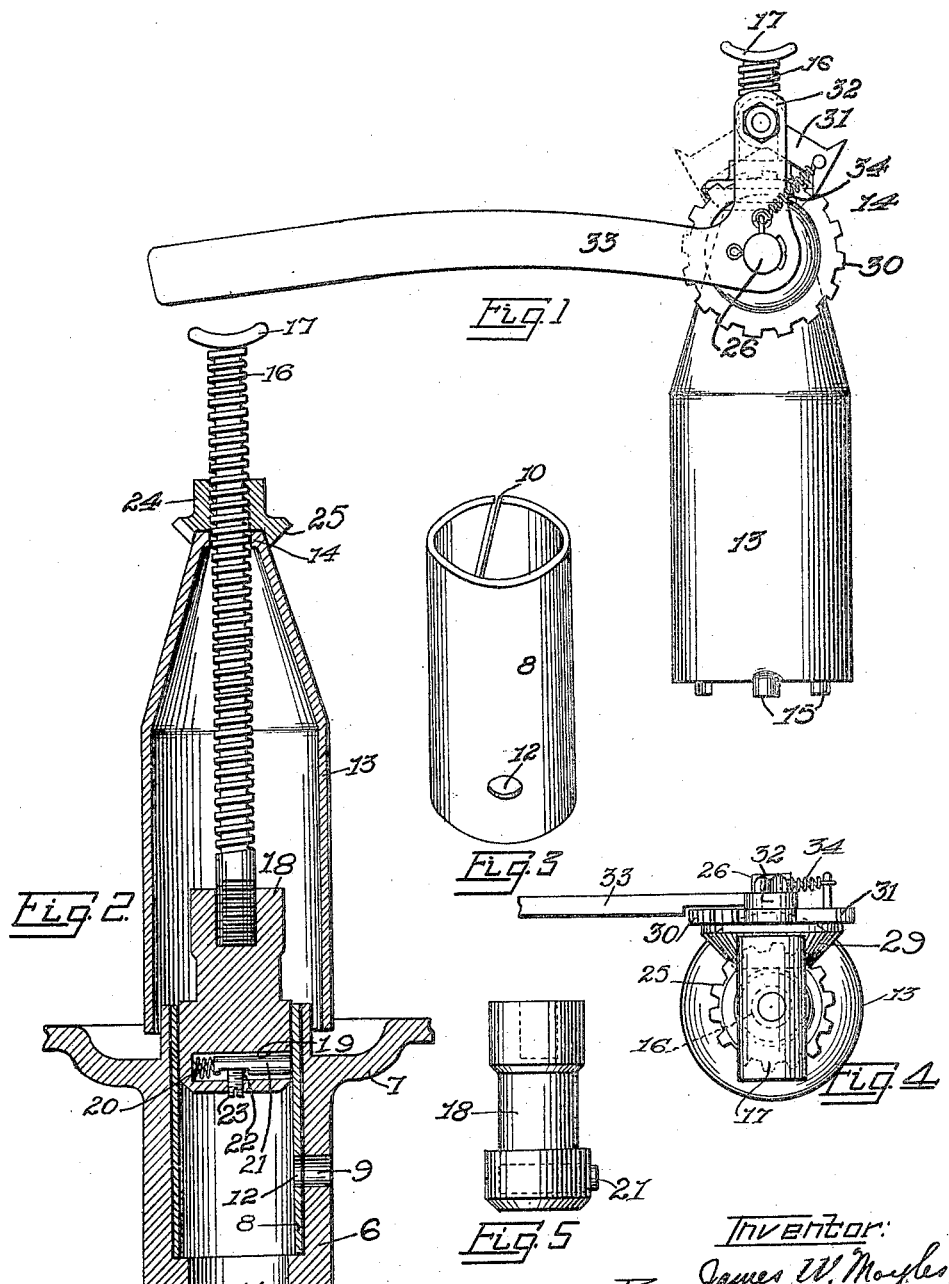

JAMES W. MOYLES, OF CHICAGO, ILLINOIS.

COMBINED SLEEVE-PULLER AND LIFTING-JACK.

1,400,897.   Specification of Letters Patent.   Patented Dec. 20, 1921.

Application filed March 3, 1920. Serial No. 362,988.

*To all whom it may concern:*

Be it known that I, JAMES W. MOYLES, a citizen of the United States, residing at Chicago, Cook county, Illinois, have invented certain new and useful Improvements in Combined Sleeve-Pullers and Lifting-Jacks, of which the following, taken in connection with the drawings, is a description.

My invention has for its object the production of a device adapted for use in connection with certain motor vehicles which utilize inner sleeves in the axle bearing thereof, and from which it is necessary to withdraw the same when they become worn. This has heretofore been accomplished with much difficulty owing to the tight fit of the sleeve within the housing.

A further object of my invention is to provide a mechanism of this class which shall employ in its construction mechanical means to be inserted within the sleeve in the axle bearing to engage said sleeve through an aperture provided therein, and by said engagement withdraw the sleeve bodily from the bearing, which can be accomplished within a very short period of time and without injury to any of the parts of the mechanism.

It is also an object of my invention to provide a tool of this kind which can be used as a lifting jack without changing its construction in any manner.

These and other objects of the invention will be apparent to those skilled in this art, and in the accompanying drawings I have illustrated the best form of construction known to me at this time, which construction embodies the essential elements of my invention, although I do not desire to be limited to its precise details, and in these drawings:—

Figure 1 is a side elevation of my invention;

Fig. 2 is a vertical, sectional view through the same; also a fragmentary detail of an axle bearing having the sleeve therein, Fig. 3 is a perspective detail of one of the sleeves detached from the bearing;

Fig. 4 is a top plan view of the device and:—

Fig. 5 is a detail of the plunger engaging the sleeve to be withdrawn.

Referring to the drawings 6 represents one end of an axle bearing with the housing 7 from which the axle has been removed. It frequently becomes necessary to change the sleeves, 8, in this type of bearing when they have become worn, or for any other reason it is desirable to remove them.

The form of bearing here shown is that in general use on Ford cars, although I contemplate other forms of construction using a sleeve bearing as described herein. In this bearing, 9, is an aperture through which the lubricant passes to the axle when the device is assembled for use. The sleeve, 8, is cylindrical in form and is split along one side thereof as at 10, which affords sufficient resiliency to the sleeve to insure a tight fit when placed within the bore, 11, in the bearing, as it is used and the sleeve is maintained therein by frictional engagement. This sleeve 8 is provided with an aperture 12 which registers with the aperture 9 in the bearing when assembled for use.

My device is embodied in the casing 13, which is preferably cylindrical in form tapering to a neck 14 at the upper end thereof. This casing 13 may be or may not be provided with the feet 15, spaced apart around the circumference of the casing at the bottom thereof. The neck 14 is provided with an opening through which the vertical movable lifting rod, 16, extends on the top of which is attached a concave supporting member, 17, for use when the device serves as a lifting jack.

18 is a plunger having screw threaded engagement with the lower end of the lifting screw, 16, and which is adapted to be inserted within the sleeve, 8, to withdraw it from the bearing. The head of this movable plunger 18 is provided with a socket 19, extending transversely of the same, and seated therein is a spring 20. Positioned within said socket 19 is a small plunger 21, one end of which bears against the spring 20, the opposite end normally projecting a short distance beyond the outer wall of the head of the plunger 18. This plunger 21, has a recess portion, 22, upon one side thereof, into which projects a screw 23 which is designed to limit the movement of said plunger for a purpose hereinafter described.

Surrounding the threaded rod, 16, and inclosing the upper end of the casing, 13, is a cap 24, which has formed integrally therewith a beveled gear 25. Suitably mounted upon a stub shaft 26, projecting from the casing 13 is a corresponding beveled gear 29, normally in engagement with the beveled gear 25.

Arranged upon the peripheral face of the gear 29, are ratchet teeth 30, adapted to be engaged by a pawl, 31, and which is supported upon the short arm 32 of the bell crank lever 33, mounted upon the stub shaft 26.

The spring 34 engages said pawl and connects the same with a stationary point on the shaft 26 and serves to hold the pawl in operative relation with the ratchet teeth when gear 29 is to be operated in either direction.

When the device is to be used to extract a sleeve from the bearing proper, the axle being removed, the bearing is preferably placed in an upright position as shown in Fig. 2. The casing 13 is placed directly above the sleeve to be withdrawn, the feet, 15, or the edge of the cylinder 13 resting upon the housing of the bearing.

The end of the transversely extending plunger 21, normally projects beyond the wall of the plunger 18 as shown more clearly in Fig. 5. When the plunger 18 is to be inserted within the sleeve 8, the plunger 21 is depressed against the tension of the spring 20 to permit the plunger 18 to enter the sleeve 8 as shown in Fig. 2. When the plunger 21 registers with the aperture 12, the force of the spring 20 being exerted against it causes it to move outwardly to normal position and engage the sleeve by extending into the opening 12.

By operating the lever 33 to elevate the rod 16 through the top of the casing 13, as the plunger 18 moves upwardly with it, it withdraws the sleeve 8 from its position within the bearing 6. When the sleeve is withdrawn from the bearing, it is disengaged from the plunger 18 by simply withdrawing the plunger therefrom.

To utilize the device as a lifting device, the plunger is disengaged from the rod 6, and the axle or other weight desired to be elevated is placed upon the support 17 and by the operation of the screw 16 by means of the lever 32, the load may be easily elevated.

I claim:

1. In a sleeve pulling device, the combination of a casing, a movable lifting rod therein, a plunger having engagement with one end of said lifting rod which is adapted for insertion within the sleeve to be withdrawn, and means extending transversely of said plunger for engagement with said sleeve inside the bearing, substantially as described.

2. In a sleeve pulling device, the combination of a casing, a movable lifting rod therein, a plunger having engagement with the lower end of said lifting rod, said plunger having a socket extending transversely therein, a spring in said socket, and a plunger seated against said spring and actuated thereby, one end of said last named plunger adapted to engage an opening in the wall of the sleeve to be withdrawn, substantially as described.

3. In a combined sleeve pulling device and lifting jack, a cylindrical casing tapering in diameter at the upper end thereof, a threaded rod mounted therein, a supporting member carried upon said rod, gear operated mechanism moving said rod, a plunger movable with said rod, said plunger having a laterally extending engaging member fitting an opening in the sleeve to be pulled whereby the sleeve is withdrawn with the upward movement of said rod and plunger.

4. In a combined sleeve pulling device and lifting jack, a cylindrical casing tapering in diameter at the upper end thereof, a movable rod in said casing, a supporting member carried on the upper end of said rod, a plunger on the lower end of said rod adapted to engage an opening in the inner wall of the sleeve and the bearing, and means for moving said rod and withdrawing the plunger and sleeve.

In testimony whereof I have signed this specification.

JAMES W. MOYLES.